United States Patent [19]

Furuhashi et al.

[11] Patent Number: 4,647,736
[45] Date of Patent: Mar. 3, 1987

[54] APPARATUS FOR RETURNING TURN INDICATOR OPERATING LEVER FOR VEHICLE

[75] Inventors: Kenshi Furuhashi; Hiroyasu Ito; Kouichi Fukao, all of Niwa, Japan

[73] Assignee: Kabushiki Kaisha Tokai-Rika-Denki-Seisakusho, Aichi, Japan

[21] Appl. No.: 764,921

[22] Filed: Aug. 12, 1985

[30] Foreign Application Priority Data

Aug. 16, 1984 [JP] Japan ............................ 59-124949[U]

[51] Int. Cl.$^4$ .............................................. H01H 3/16
[52] U.S. Cl. .................................................. 200/61.27
[58] Field of Search ................ 200/61.27, 61.38, 61.54

[56] References Cited

U.S. PATENT DOCUMENTS 2,427,595  9/1947  Fuller ............................... 200/61.34
3,408,467  10/1968 Shenstone et al. ............... 200/61.27
3,557,328  1/1971  Wingrocki et al. .............. 200/61.27
3,604,867  9/1971  Suzuki .............................. 200/61.34
3,914,566  10/1975 Wendling ......................... 200/61.27
4,570,041  2/1986  Ishiguro ...................... 200/61.34 X Primary Examiner—J. R. Scott
Attorney, Agent, or Firm—Koda and Androlia

[57] ABSTRACT

An apparatus for returning a turn indicator operating lever to the neutral position in response to the turning of a steering wheel includes engagement pieces which abut against a canceling cam rotated in response to the turning of the steering wheel for the purpose of returning the operating lever to the neutral position. The engagement pieces are disposed on the one side of a steering shaft where the operating lever is disposed. It is therefore possible for various kinds of elements such as sensors to be disposed on the other side of the steering shaft.

8 Claims, 7 Drawing Figures

APPARATUS FOR RETURNING TURN INDICATOR OPERATING LEVER FOR VEHICLE

BACKGROUND OF THE INVENTION

1. Field of the Invention

The present invention relates to an apparatus for returning a turn indicator operating lever arranged such that the operating lever which has been actuated for the purpose of indicating the course of the vehicle when changing its advancing direction is automatically returned to the neutral position by turning the steering wheel in the opposite direction relative to the turning direction by which the course of travel is changed.

2. Description of the Prior Art

In the conventional apparatus of the type described above, a bracket is pivotally supported on a base plate in such a manner as to surround the periphery of a steering shaft around which a cylindrical canceling cam is positioned. The turn indicator operating lever is mounted on one side of the bracket, that is, one side of the steering shaft, and a ratchet which constitutes a part of the returning apparatus is provided on the other side of the steering shaft. The arrangement is such that, when the bracket is pivoted leftwardly or rightwardly by the action of the operating lever which is actuated for the purpose of indicating a left-turn or right-turn of the vehicle, a pawl of the ratchet is positioned on the locus of rotation of a cam projection of a canceling cam which rotates in response to the turning of the steering wheel, whereby, when the canceling cam is rotated in the opposite direction relative to the direction in which the lever has been actuated, the cam projection of the canceling cam presses against the pawl of the ratchet, thus causing the bracket and in turn the operating lever to be returned to the neutral position.

The above-described conventional arrangement, however, suffers from the following problem. Namely, since the bracket is provided in such a manner as to surround the canceling cam, it is necessary for the bracket to possess a disadvantageously large size, which fact unfavorably leads to an increase in the size of the returning apparatus as a whole.

In order to overcome the above-described disadvantage, the applicant of the present invention has previously proposed a device (Japanese Utility Model Application No. 165,187/1979) in which a bracket which pivots in response to the actuation of the operating lever is provided with a first gear, while a ratchet holder provided with a second gear which is meshed with the first gear is disposed pivotally and is equipped with a ratchet, and when the canceling cam is rotated in the same direction as the actuation direction of the operating lever, the ratchet acts such as to allow the canceling cam to rotate, while when the canceling cam is rotated in the opposite direction, the bracket is returned to the neutral position through the ratchet holder.

This arrangement, however, has a complicated gear structure, which creates the new problem that labor and time are required in assembly when, for example, a positioning operation is conducted. Further, since the second gear shaft is disposed between the operating lever and the steering shaft, the position where the operating lever is pivotally supported is unfavorably separated from the steering shaft.

Moreover, another structure has previously been proposed (U.S. Pat. No. 3,794,785) in which an operating lever and a single ratchet are provided on one side of a steering shaft. This structure, however, involves the same problem as that of the prior art described above, that is, the position where the operating lever is pivotally supported is excessively separated from the steering shaft.

SUMMARY OF THE INVENTION

In view of the above-described circumstances, it is a primary object of the present invention to provide an apparatus for returning a turn indicator operating lever for a vehicle which enables a reduction in the size, requires no gear mechanism or the like and has a simplified structure.

To this end, the invention provides an apparatus for returning a turn indicator operating lever for a vehicle to a neutral position in response to the turning of a steering wheel in which the operating lever is pivotally supported in the vicinity of a steering shaft, and a regulating mechanism is provided. The regulating mechanism retains the operating lever in either one of the first and second positions when it has been moved thereto from the neutral position for the purpose of indicating a change in the advancing direction of the vehicle and returns the operating lever to the neutral position when the retained state is canceled. The apparatus further includes a pair of engagement means provided on the one side about the steering shaft where the operating lever is disposed. The engagement means are respectively disposed on the opposite sides of the pivotal center of the operating lever in such a manner as to oppose a canceling cam which is rotated in response to the turning of the steering wheel. One of the engagement means is adapted to enter the locus of rotation of the canceling cam when the operating lever is moved to the first position, while the other engagement means is adapted to enter that locus when the operating lever is moved to the second position, whereby the operating lever is returned to the neutral position by means of the rotational force of the canceling cam rotating in response to the turning of the steering wheel in the opposite direction relative to the direction in which the operating lever has been moved.

In a state wherein the operating lever is pivoted to either one of the first and second positions and one of the engagement means is thereby caused to enter the locus of rotation of the canceling cam, when the canceling cam is rotated in the same direction as that in which the operating lever has been pivoted, the engagement means concerned is slid in a direction in which it is separated from the canceling cam, thereby allowing the canceling cam to rotate, while when the canceling cam is rotated in the opposite direction, the engagement means concerned is engaged with the canceling cam, thus causing the operating lever to return to the neutral position.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
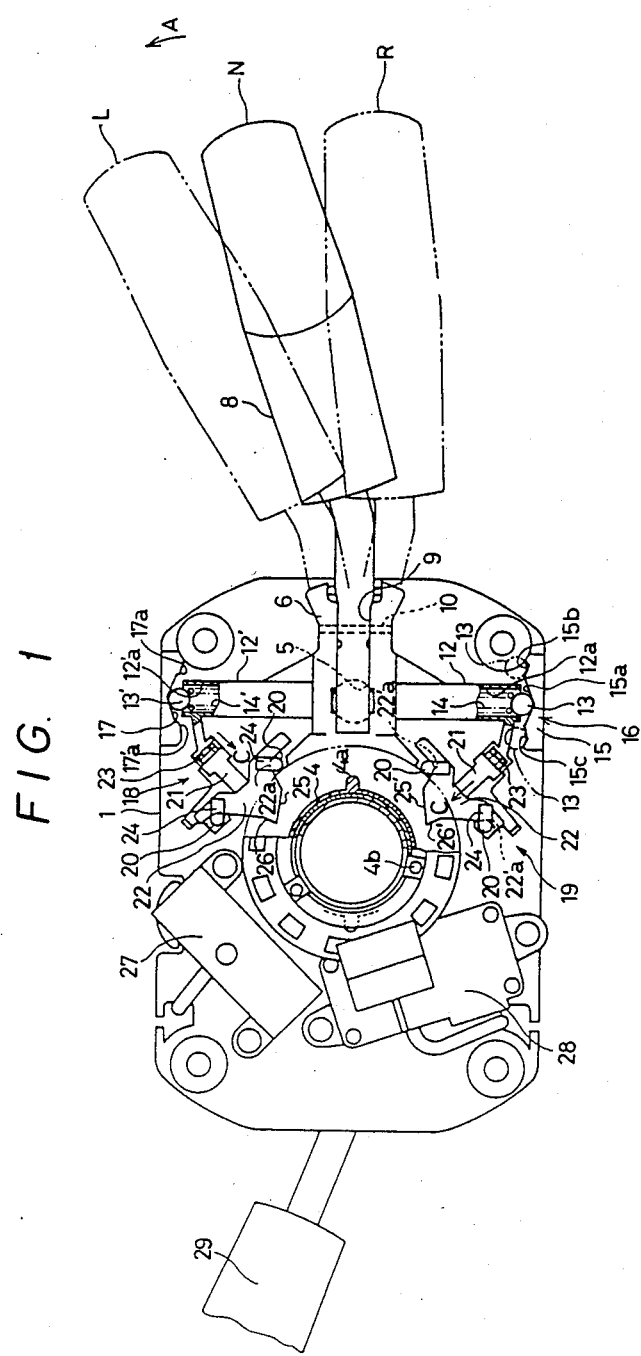
FIG. 1 is a plan view of a first embodiment of the present invention.

A first embodiment of the present invention will be described hereinunder with reference to FIGS. 1 to 5.

A base plate 1 is secured to a steering column (not shown) which is mounted on a vehicle body. The base plate 1 is formed with a cylindrical portion 3 for receiving a steering shaft 2. A steering wheel (not shown) is connected to the upper end of the steering shaft 2, and a gear box (not shown) is connected to the lower end of the steering shaft 2 as viewed in FIG. 2.

A cylindrical canceling cam 4 is rotatably fitted on the outer periphery of the cylindrical portion 3. The canceling cam 4 has two cam projections 4a projecting from its outer periphery and further has a plurality of projections 4b projecting from its upper end, these projections 4b being engaged with the steering wheel, whereby the canceling cam 4 is rotated in response to the turning of the steering wheel in the same direction as the turning direction of the steering wheel.

A pivotally supporting bore 5 is formed in the base plate 1 in the vicinity of the outer periphery of the canceling cam 4 and in parallel to the steering shaft 2 such that the supporting bore 5 serves as a pivotal center. A hollow support shaft 7 is pivotally received in the pivotally supporting bore 5, the support shaft 7 projecting downwardly from the lower surface of a bracket 6. An operating lever 8 has its distal end projecting outwardly of the base plate 1 and its proximal end fitted into a bearing recess 9 formed in the bracket 6 as well as being supported by a support shaft 10 which is mounted on the bracket 6. Thus, the operating lever 8 is pivotal about the pivotally supporting bore 5 together with the bracket 6 in one unit from the neutral position N shown by the solid line in FIG. 1, both in the direction of the arrow A and in the opposite direction relative thereto. The operating lever 8 is also pivotal about the support shaft 10 in the direction of the arrow B shown in FIG. 2 while rotating relative to the bracket 6, for operating a dimmer and passing switch (not shown).

Figure 2:
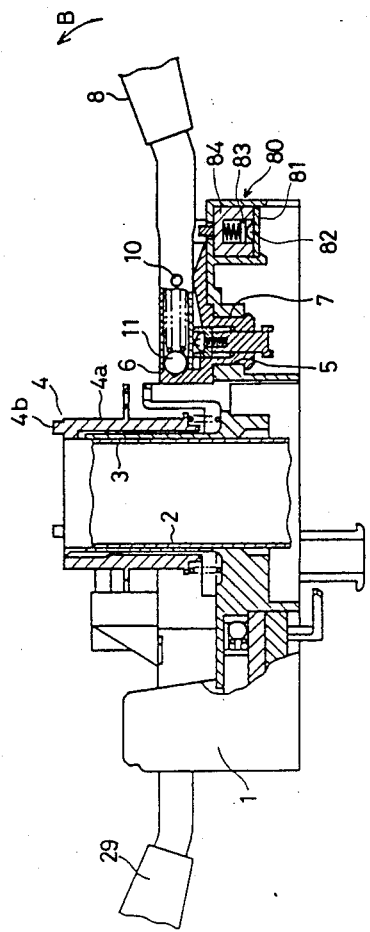
FIG. 2 is a vertical sectional side elevational view of the first embodiment.

As shown in FIG. 2, a turn signal switch 80 is mounted on the base plate 1 in such a manner as to face the operating lever 8. The turn signal switch 80 is constituted by a plurality of fixed contacts 82 which are disposed on an insulator 81 at predetermined distances such as to oppose a movable contact 83. The movable contact 83 is mounted on a contact holder 84 which is caused by the operating lever 8 to move in a direction orthogonal to the longitudinal axis of the operating lever 8.

Accordingly, as the operating lever 8 moves from the neutral position N shown in FIG. 1 to either the position R which indicates a right-turn of the vehicle or the position L which indicates a left-turn of the vehicle, the position of contact between the movable contact 83 and the fixed contacts 82 is changed, whereby it is possible to turn on turn signal lamps (not shown) indicating a right-turn or a left-turn of the vehicle.

A regulating mechanism 11 is provided at the proximal end of the operating lever 8. The regulating mechanism 11 is adapted to return the operating lever 8 which has been pivoted in the direction of the arrow B to the neutral position N.

Arms 12 and 12' are formed integrally on the bracket 6 in such a manner as to be located on both sides of the support shaft 7 in such a manner that the line bisecting the respective longitudinal axes of the arms 12 and 12' is orthogonal to the longitudinal axis of the support shaft 7 and is substantially orthogonal to the longitudinal axis of the bearing recess 9. The arms 12 and 12' have bores 12a and 12'a formed at their respective distal ends. Balls 13 and 13' are fitted into the respective openings of the bores 12 and 12'. The balls 13 and 13' are biased outwardly of the respective openings by means of springs 14 and 14' which are respectively inserted into the bores 12a and 12'a. A regulating wall 15 is provided on the base plate 1 in such a manner as to oppose the ball 13. The regulating wall 15 is constituted by first to third valley portions 15a, 15b and 15c. The regulating wall 15, the arm 12, the ball 13 and the spring 14 in combination constitute a regulating mechanism 16.

The regulating mechanism 16 is adapted to retain the operating lever 8 at any one of the three positions shown in FIG. 1: namely, the neutral position N where the ball 13 is engaged with the first valley portion 15a of the regulating wall 15; the first position L which represents a left-turn indication and at which the ball 13 is engaged with the second valley portion 15b as a result of the pivoting of the operating lever 8 in the direction of the arrow A from the neutral position N; and the second position R which represents a right-turn indication and at which the ball 13 is engaged with the third valley portion 15c as a result of the pivoting of the operating lever 8 in the opposite direction relative to the direction of the arrow A from the neutral position N.

A valley portion 17 is provided on the base plate 1 in such a manner as to oppose the ball 13'. Projections 17a and 17'a are formed at both ends of the valley portion 17. The arrangement is such that, as the operating lever 8 is actuated such as to shift from the neutral position N to a lane-change position (a position slightly before either the first or second position), the ball 13' abuts against either the projection 17a or the projection 17'a.

First and second mounting sections 18 and 19 are provided on the bracket 6 symmetrically with respect to each other and with respect to the support shaft 7. As shown in FIG. 1, these mounting sections 18 and 19 oppose one half of the outer periphery of the canceling cam 4 on the side thereof which is closer to the supporting bore 5. In other words, the first and second mounting sections 18 and 19 are disposed on one side of the steering shaft 2 which is closer to the operating lever 8. Each of the first and second mounting sections 18 and 19 has two engagement shafts 20 standing on the bracket 6 and a tubular portion 21 which is formed on the bracket 6 and positioned between the engagement shafts 20.

Engagement pieces 22 and 22' which serve as cam bodies are respectively mounted on the first and second mounting sections 18 and 19 in such a manner that two engagement recesses 22a of the engagement piece 22 and two engagement recesses 22'a of the engagement piece 22' are respectively engaged with the corresponding engagement shafts 20. The central portion of each of the engagement pieces 22 and 22' is biased in the direction of the arrow C, that is, toward the canceling cam 4 by means of a compression coil spring 23 which is received in the corresponding tubular portion 21. Each of the engagement pieces 22 and 22' is received between the bracket 6 and retainer pieces 24 which project from the respective distal ends of the engagement shafts 20. Arm extension 12b connects the tubular portion 21 to the tubular arm 12. Thus, each of the engagement pieces 22 and 22' is movable both in the direction of the arrow C and in the opposite direction relative thereto. A retainer piece 21A projects from each of the tubular portions 21 toward the corresponding one of the engagement pieces 22 and 22' in such a manner as to prevent the corresponding compression coil spring 23 from coming off the associated tubular portion 21. Each of the retainer pieces 21A also acts in such a manner that, when the corresponding one of the engagement pieces 22 and 22' moves to the position shown by the imaginary line in FIG. 3 and enters the space between the retainer piece 21A and the bracket 6, the retainer piece 21A prevents the engagement piece from falling off the bracket 6.

The reference numerals 25 and 25' represent first cam surfaces which respectively project from the engagement pieces 22 and 22' toward the canceling cam 4, while the numerals 26 and 26' denote second cam surfaces which are respectively formed adjacent to the first cam surfaces 25 and 25'. Each of the first cam surfaces 25 and 25' has a relatively gentle slant and is located on the inner side of the corresponding one of the engagement pieces 22 and 22', that is, on the side thereof which is closer to the support shaft 7 of the bracket 6, while each of the second cam surfaces 26 and 26' has a relatively steep slant and is located on the outer side of the corresponding one of the engagement pieces 22 and 22'.

It is to be noted that the reference numeral 27 represents an optical signal transmitting means which is located on another half of the outer periphery of the canceling cam 4 which is remote from the supporting bore 5 and is secured to the base plate 1, this means being employed for transmission of optical signals between the same and electronic elements, such as a switch, provided on the steering wheel, and the reference numeral 28 represents a sensor for detecting a rotation relocity of the steering shaft. In addition, the numeral 29 denotes a wiper operating lever.

The following is a description of the operation of the above-described arrangement.

Figure 3:
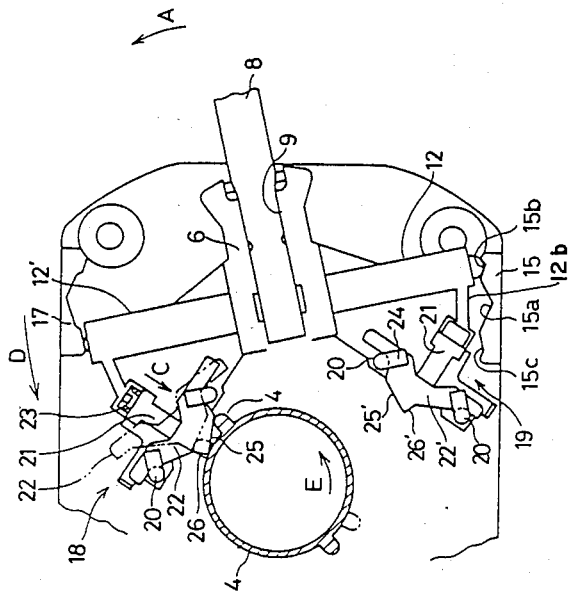
Figure 5:
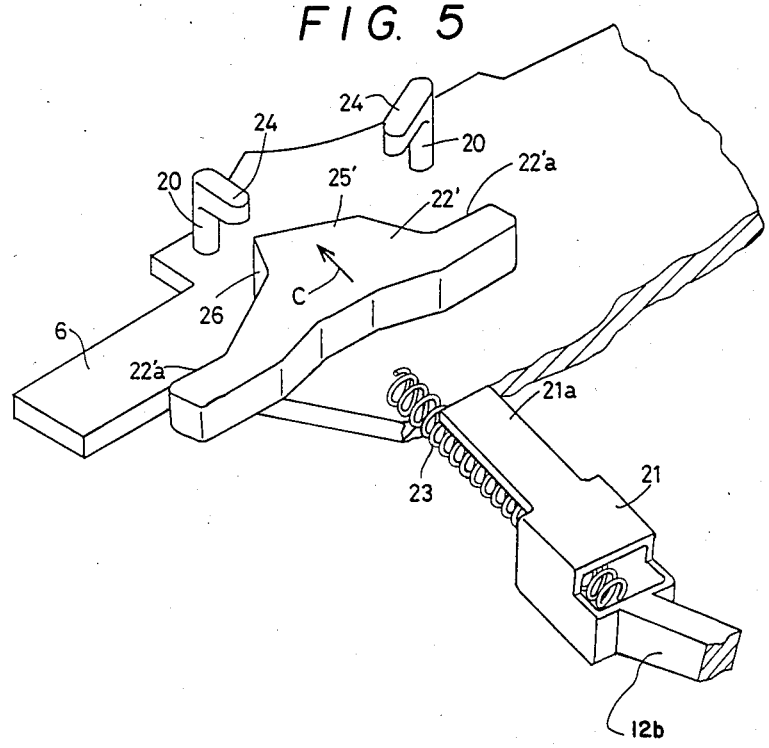
FIG. 5 is an partial exploded perspective view of an essential portion of the first embodiment.

When the operating lever 8 is in the neutral position N, both the engagement pieces 22 and 22' are positioned outside the locus of rotation of the cam projections 4a of the canceling cam 4. When the operating lever 8 is pivoted in the direction of the arrow A from the neutral position N to the first position L which indicates a left-turn of the vehicle, the arm 12 on the bracket 6 is also pivoted in the direction of the arrow D as shown in FIG. 3, thus causing the ball 13 to move from the first valley portion 15a to the second valley portion 15b against the resilient force of the spring 14. In consequence, the operating lever 8 is retained in the first position L, and the turn signal switch 80 is actuated to turn on the turn signal lamps (not shown) which indicate a left-turn of the vehicle.

Further, the pivoting of the bracket 6 in the direction of the arrow D causes also the engagement piece 22 on the first mounting section 18 to pivot in the direction of the arrow D. Consequently, the first and second cam surfaces 25 and 26 of the engagement piece 22 enter the locus of rotation of the cam projections 4a of the canceling cam 4.

When, under this state, the steering wheel is turned such as to rotate the canceling cam 4 in the direction of the arrow E, which is the same direction as the direction of the arrow A in which the operating lever 8 has been pivoted, the cam projections 4a of the canceling cam 4 slide on the first cam surface 25, thus causing the engagement piece 22 to retract against the resilient force of the spring 23 in the opposite direction relative to the direction of the arrow C as shown by the imaginary line in FIG. 3. In consequence, the operating lever 8 is retained in the first position L as it is.

Figure 4:
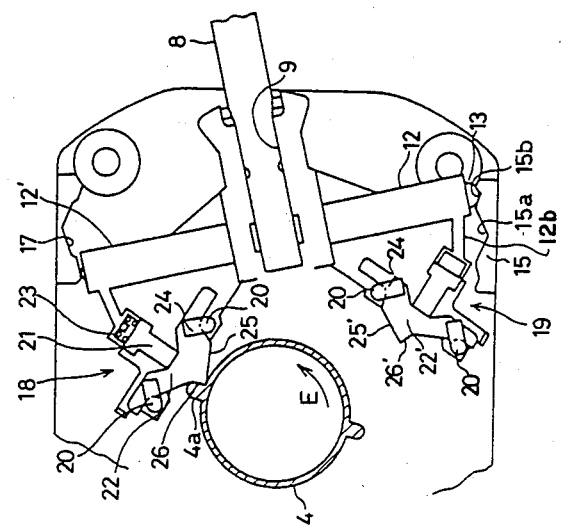
FIGS. 3 and 4 are plan views of an essential portion of the first embodiment, which show the operation thereof.

On the other hand, when the canceling cam 4 is rotated in the opposite direction relative to the direction of the arrow E by the turning of the steering wheel, either one of the cam projections 4a engages with the second cam surface 26 as shown in FIG. 4, thus causing the engagement piece 22 and the first mounting section 18 to pivot in the opposite direction relative to the direction of the arrow D. Thus, the bracket 6 and the operating lever 8 are returned to the neutral position N.

When the operating lever 8 is pivoted in the opposite direction relative to the direction of the arrow A from the neutral position N to the second position R, the ball 13 at the distal end of the arm 12 moves from the first valley portion 15a to the third valley portion 15c against the resilient force of the spring 14 and engages with the third valley portion 15c. In consequence, the operating lever 8 is retained in the second position R, and the turn signal lamps for indicating a right-turn are turned on.

At this time, the engagement piece 22' and its first and second cam surfaces 25' and 26' on the second mounting section 19 enter the locus of rotation of the cam projections 4a of the canceling cam 4. When, under this state, the steering wheel is turned such as to rotate the canceling cam 4 in the opposite direction relative to the direction of the arrow E, which is the same direction as that in which the operating lever 8 has been pivoted, the cam projections 4a slide on the first cam surface 25', and the canceling cam 4 continuously rotates while allowing the operating lever 8 to be retained in the second position R, in a manner similar to the above. On the other hand, when the canceling cam 4 is rotated in the direction of the arrow E, either one of the cam projections 4a engages with the second cam surface 26', thus causing the operating lever 8 to return to the neutral position N.

According to the above-described embodiment, the bracket 6 which pivots together with the operating lever 8 in one unit is provided with the first and second mounting sections 18 and 19 across the support shaft 7, and the engagement pieces 22 and 22' are respectively mounted on the first and second mounting sections 18 and 19 in such a manner as to oppose one half of the outer periphery of the canceling cam 4 on the side thereof which is closer to the support shaft 7. It is therefore possible for the bracket 6 and the regulating mechanism 16 to be disposed on one side of the base plate 1 in a concentrated fashion. Thus, it is advantageously possible to reduce the size of the apparatus in contrast to the conventional apparatus in which a bracket is formed such as to surround the canceling cam. Further, since no gear mechanism or the like is required, it is possible for the structure of the apparatus to be favorably simplified.

Figure 6:
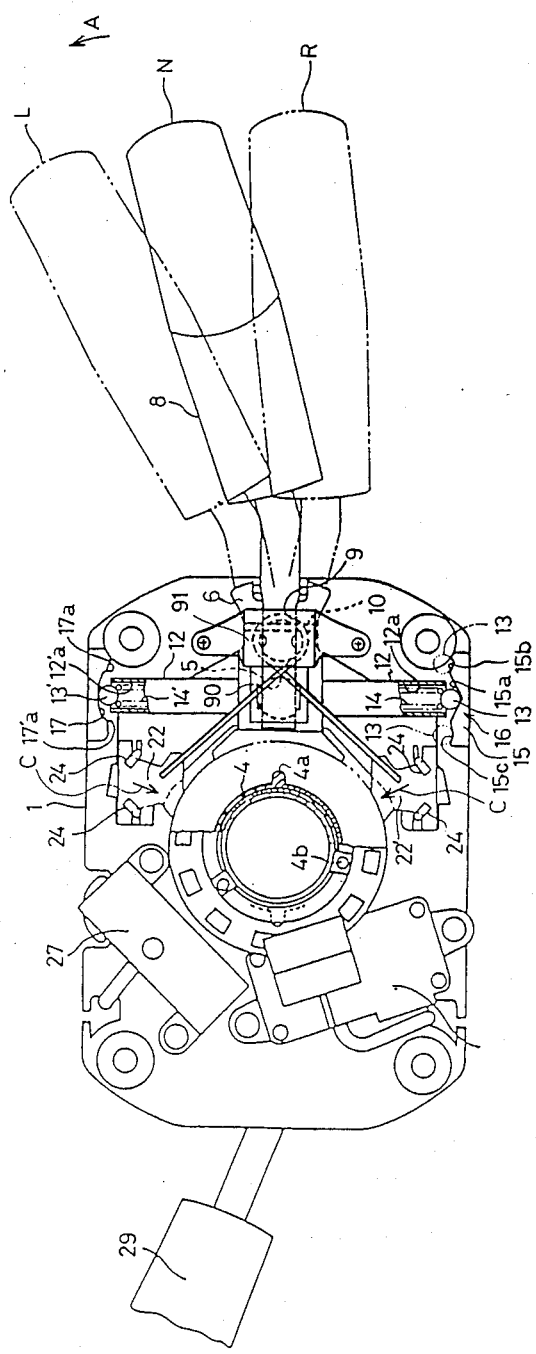
FIG. 6 is a plan view of a second embodiment of the present invention.
Figure 7:
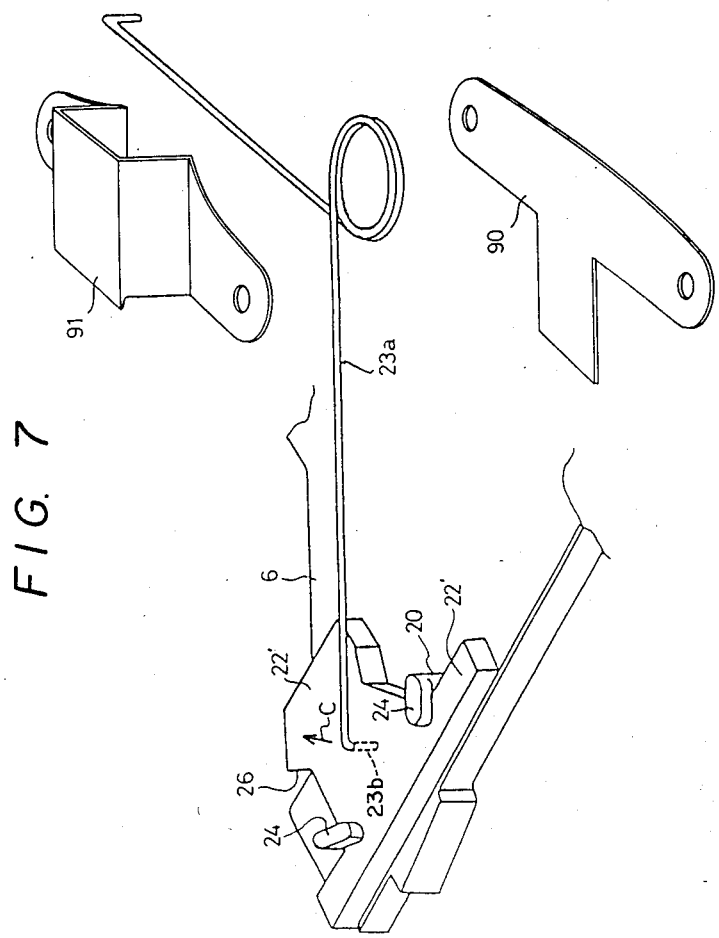
FIG. 7 is a perspective view of an essential portion of the second embodiment, which corresponds to FIG. 5.

Referring next to FIGS. 6 and 7, there is shown a second embodiment of the present invention. In this embodiment, a pair of engagement shafts 20 which support the engagement piece 22 are disposed in such a manner that the line which bisects the respective axes of the engagement shafts 20 is orthogonal to the longitudinal axis of the arm 12, 12'. The engagement shafts 20 which support the engagement piece 22' are also disposed in a manner similar to the above.

Each of the engagement pieces 22 and 22' is biased by means of a torsion coil spring 23A in a direction in which it abuts against the corresponding engagement shafts 20, that is, toward the locus of rotation of the canceling cam 4, in a manner similar to that of the first embodiment.

More specifically, the torsion coil spring 23A has both its ends bent in a direction orthogonal to the plane of the plate 1. The bent ends 23b of the torsion coil spring 23A are received in bores which are respectively formed in the engagement pieces 22 and 22' such as to bias them in the direction of the arrow C. The coil portion of the torsion coil spring 23A is received between a cover plate 90 and a holder plate 91 both secured on the base plate 1. Thus, the second embodiment possesses functions which are similar to those of the first embodiment and yet has a reduced number of required elements as compared with the first embodiment.

As will be clear from the above description, the present invention is arranged such that the bracket which pivots together with the operating lever in one unit is provided with the first and second mounting sections which are disposed across the pivotal center of the bracket, and the engagement pieces are respectively mounted on the first and second mounting sections in such a manner that the engagement pieces oppose one half of the outer periphery of the canceling cam on the side thereof which is closer to the pivotal center of the operating lever. It is therefore advantageously possible to reduce the size of the apparatus and simplify the structure thereof.

What is claimed is:

1. Apparatus for returning a turn indicator operating lever for a vehicle to a neutral position in response to turning of a steering wheel, comprising:
    a base plate;
    a bracket pivotally supported on the base plate;
    said operating lever supported on the bracket and pivoted to the base plate together with the bracket in the vicinity of a steering shaft of the vehicle;
    a regulating mechanism which retains said operating lever in either one of a first and second position and prevents said operating lever from returning to said neutral position when it has been moved thereto from said neutral position for the purpose of indicating a change in the advancing direction of the vehicle, and which returns said operating lever to said neutral position when the retained state is canceled;
    a pair of engagement means supported on said bracket at the one side about said steering shaft where said operating lever is disposed, each of said engagement means comprising an engagement piece abutting against engagement shafts which stand on said bracket at a predetermined distance from each other so that said engagement shafts limit the amount of movement of said engagement piece toward said steering shaft, each of said engagement pieces having engagement recesses formed therein to oppose said engagement shafts, said engagement pieces being respectively disposed on the opposite sides of the pivotal center of said operating lever in such a manner as to oppose a canceling cam which is rotated in response to the turning of said steering wheel, one of said engagement pieces entering the locus of rotation of said canceling cam when said operation lever is moved to said first position, and the other of said engagement pieces entering said locus when said operating lever is moved to said second position, so that said operating lever is returned to said neutral position by means of the rotational force of said canceling cam rotating in response to the turning of said steering wheel in an opposite direction relative to the direction in which said operating lever has been moved; and
    a resilient member provided for pressing said engagement piece against said engagement shafts, whereby, when said canceling cam is moved in the direction in which said operating lever has been moved, one of said engagement recesses on one of said engagement pieces is separated from the corresponding engagement shaft.

2. An apparatus according to claim 1, wherein said resilient member is constituted by a torsion coil spring which has both its end portions respectively engaged with said engagement pieces for the purpose of biasing said engagement pieces toward the locus of rotation of said canceling cam.

3. An apparatus according to claim 1, wherein a retainer piece is formed on the distal end of each of said engagement shafts for the purpose of preventing the corresponding engagement piece from coming off said bracket.

4. An apparatus according to claim 1, wherein each of said engagement pieces is prevented by a retainer piece projecting from said tubular portion from coming off said bracket in a state wherein one of said engagement recesses is separated from the corresponding engagement shaft.

5. An apparatus for returning a turn indicator operating lever in which said operating lever which has been moved from a neutral position to either one of a first and second position for respectively indicating a right-turn or a left-turn of a vehicle is returned to said neutral position by means of a canceling cam in response to the turning of a steering wheel, said apparatus comprising:
    a base plate;
    a bracket pivotally supported on the base plate and capable of selectively assuming said neutral position and said first and second positions which are on both sides of said neutral position, together with said operating lever;
    a pair of engagement pieces supported on said bracket and disposed on one side about a steering shaft, each of said engagement pieces abutting against a plurality engagement shafts which stand on said bracket at a predetermined distance from each other so that said engagement shafts limit the amount of movement of said engagement piece toward said steering shaft, each of said engagement pieces having engagement recesses formed therein for abutting against said engagement shafts, one of said engagement pieces for entering the locus of rotation of said canceling cam in response to the movement of said operating lever to the right-turn indicating position and the other of said engagement pieces for entering the locus of rotation of said canceling cam in response to the movement of said operating lever to the left-turn indicating position, whereby the first engagement piece to return to said neutral position in response to the left-turn rotation of said steering wheel, while the second engagement pieces causes said operating lever to return to said neutral position in response to the right-turn rotation of said steering wheel; and a resilient member provided for pressing said engagement piece against said engagement shafts, whereby, when said canceling cam is moved in the direction in which said operating lever has been moved, one of said engagement recesses on one of said engagement pieces is separated from the corresponding engagement shaft.

6. An apparatus according to claim 5, wherein said resilient member is constituted by a torsion coil spring which has both its end portions respectively engaged with said engagement pieces for the purpose of biasing said engagement pieces toward the locus of rotation of said canceling cam.

7. An apparatus according to claim 5, wherein a retainer piece is formed on the distal end of each of said engagement shafts for the purpose of preventing the corresponding engagement piece from coming off said bracket.

8. An apparatus according to claim 5, wherein each of said engagement pieces is prevented by a retainer piece projecting from said tubular portion from coming off said bracket in a state wherein one of said engagement recesses is separated from the corresponding engagement shaft.

* * * * *